US009323847B1

(12) United States Patent
Cionca et al.

(10) Patent No.: US 9,323,847 B1
(45) Date of Patent: Apr. 26, 2016

(54) PRESENTING SEARCH RESULTS

(71) Applicant: Google Inc., Mountain View, CA (US)

(72) Inventors: Lucian F. Cionca, Santa Clara, CA (US); Alexander Sobol, Los Altos, CA (US); Andre Rohe, Mountain View, CA (US); Sangsoo Sung, Palo Alto, CA (US); Okan Kolak, Sunnyvale, CA (US); Bryan C. Horling, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/567,337

(22) Filed: Dec. 11, 2014

Related U.S. Application Data

(63) Continuation of application No. 13/623,224, filed on Sep. 20, 2012, now Pat. No. 8,935,245.

(60) Provisional application No. 61/536,933, filed on Sep. 20, 2011.

(51) Int. Cl.
*G06F 17/30* (2006.01)
*H04L 29/08* (2006.01)

(52) U.S. Cl.
CPC .... *G06F 17/30864* (2013.01); *G06F 17/30648* (2013.01); *H04L 67/306* (2013.01)

(58) Field of Classification Search
CPC .................. G06F 17/30867; G06F 17/30864; G06F 17/30648; G06F 67/306
USPC ......................................... 707/722, 723, 732
See application file for complete search history.

(56) References Cited

U.S. PATENT DOCUMENTS

| | | | |
|---|---|---|---|
| 6,377,961 B1 | 4/2002 | Ryu | |
| 7,827,170 B1* | 11/2010 | Horling | G06F 17/3053 707/722 |
| 8,370,334 B2 | 2/2013 | Ferrenq et al. | |
| 8,538,960 B2* | 9/2013 | Wong | G06F 17/30861 707/732 |
| 8,554,756 B2* | 10/2013 | Gemmell | G06F 17/30867 707/706 |
| 2003/0093314 A1* | 5/2003 | Leung | G06Q 30/02 705/14.13 |
| 2007/0250585 A1* | 10/2007 | Ly | G06F 17/30864 709/206 |
| 2007/0276811 A1 | 11/2007 | Rosen | |
| 2011/0055207 A1* | 3/2011 | Schorzman | G06F 17/30699 707/723 |
| 2011/0087661 A1* | 4/2011 | Quick | G06F 17/30554 707/732 |

(Continued)

FOREIGN PATENT DOCUMENTS

WO 2009/117273 9/2009

*Primary Examiner* — Phong Nguyen
(74) *Attorney, Agent, or Firm* — Fish & Richardson P.C.

(57) ABSTRACT

Methods, systems, and apparatus, including computer programs encoded on computer storage media, for presenting search results. One of the methods includes obtaining, based on a search request, search results that comprise a first user profile and a second user profile. The method includes determining a popularity difference between a first popularity associated with the first user profile and a second popularity associated with the second user profile. The method includes determining that the popularity difference exceeds a threshold. The method includes based on determining that the popularity difference exceeds the threshold, causing the search results to be presented in a display area such that the first user profile is emphasized relative to the second user profile within the display area.

20 Claims, 8 Drawing Sheets

(56) References Cited

U.S. PATENT DOCUMENTS

| | | | |
|---|---|---|---|
| 2011/0320423 A1* | 12/2011 | Gemmell | G06F 17/30867 707/706 |
| 2011/0321129 A1* | 12/2011 | Kinsel | H04L 67/306 726/4 |
| 2012/0059732 A1* | 3/2012 | Dakka | G06Q 30/0611 705/26.4 |
| 2012/0166277 A1* | 6/2012 | Gnanamani | G06F 17/30864 705/14.49 |
| 2012/0290977 A1* | 11/2012 | Devecka | H04W 4/206 715/810 |
| 2012/0290979 A1* | 11/2012 | Devecka | H04W 4/206 715/810 |
| 2013/0036114 A1* | 2/2013 | Wong | G06F 17/30861 707/732 |
| 2013/0332592 A1* | 12/2013 | Kinsel | G06F 17/30867 709/223 |

* cited by examiner

PRESENTING SEARCH RESULTS

CROSS-REFERENCE TO RELATED APPLICATION

This application is a continuation application of and claims priority to U.S. application Ser. No. 13/623,224, filed on Sep. 20, 2012, entitled "Presenting Search Results," which claims priority to U.S. Provisional Application Ser. No. 61/536,933, filed on Sep. 20, 2011, entitled "Presenting Search Results," the entire contents of each application are hereby incorporated by reference.

BACKGROUND

This specification relates generally to information retrieval, and particularly to inferring social affinity based on interactions with search results.

Search engines identify resources (e.g., images, audio, video, Web pages, text, documents) that are relevant to a user's needs and present information about the resources in a manner that is useful to the user. For example, a search engine returns a set of search results in response to a user submitted query. A user may give more weight to search results that are associated with reviews, opinions, or other content associated with the user's social graph (e.g., contacts of the user).

SUMMARY

In general, in one aspect, a method includes obtaining, based on a search request, search results that include a first user profile and a second user profile, determining a popularity difference between a first popularity associated with the first user profile and a second popularity associated with the second user profile, determining that the popularity difference exceeds a threshold, and based on determining that the popularity difference exceeds the threshold, causing the search results to be presented in a display area such that the first user profile is emphasized relative to the second user profile within the display area.

In general, in another aspect, a method includes determining a threshold based on the frequency with which search requests similar to a received search request have been submitted, identifying, based on the search request, search results that include a user profile, determining a score for the user profile, the score being based on a popularity of the user profile or a quality of the user profile, determining that the score exceeds the threshold, and based on determining that the score exceeds the threshold, causing the search results to be presented in a display area.

Aspects may include one or more of the following features.

A quality difference is determined between a first quality associated with the first user profile and a second quality associated with the second user profile. It is determined that the quality difference exceeds a second threshold. The first popularity of the first user profile is based on a number of other user profiles that have an association with the first user profile. The association includes a social graph connection to the first user profile. The social graph connection includes one or more of a friendship with, or a subscription to, the first user profile. Causing the search results to be presented includes causing the first user profile to be presented in combination with a first image, and causing the second user profile to be presented in combination with a second image. Causing the search results to be presented such that the first user profile is emphasized relative to the second user profile includes causing the first image to be larger in size than the second image. The first popularity is represented by a first popularity score and the second popularity is represented by a second popularity score. The popularity difference is based on one or more of a difference between the first popularity score and the second popularity score, and a ratio of the first popularity score to the second popularity score. The display area includes a portion of a user interface that is separate from display areas relating to search results that do not include user profiles. The score is further based on an affinity between the user profile and a second user profile associated with the search request. The score is adjusted based on respective scores of both profile and non-profile search results. The threshold is adjusted based on respective scores of both profile and non-profile search results. The display area is altered based on the score. Altering the display area includes one or more of enabling or disabling the display area, adjusting a size of the display area, adjusting a location of the display area, and adjusting a number of search results that can be displayed in the display area. Determining the score further includes determining a relevancy of the user profile to the search request. The display area includes a portion of a user interface that is separate from display areas relating to search results that do not include user profiles. The frequency with which search requests similar to a received search request have been submitted is determined.

Advantages of the foregoing technique may include directing users to search results (e.g., user profiles) that are likely to be of interest and preventing the unnecessary generation of display areas within a user interface. The amount of search results that may not be of interest to a user may also be reduced.

All or part of the systems and techniques described herein may be implemented as a computer program product that includes instructions that are stored on one or more non-transitory machine-readable storage media, and that are executable on one or more processing devices. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
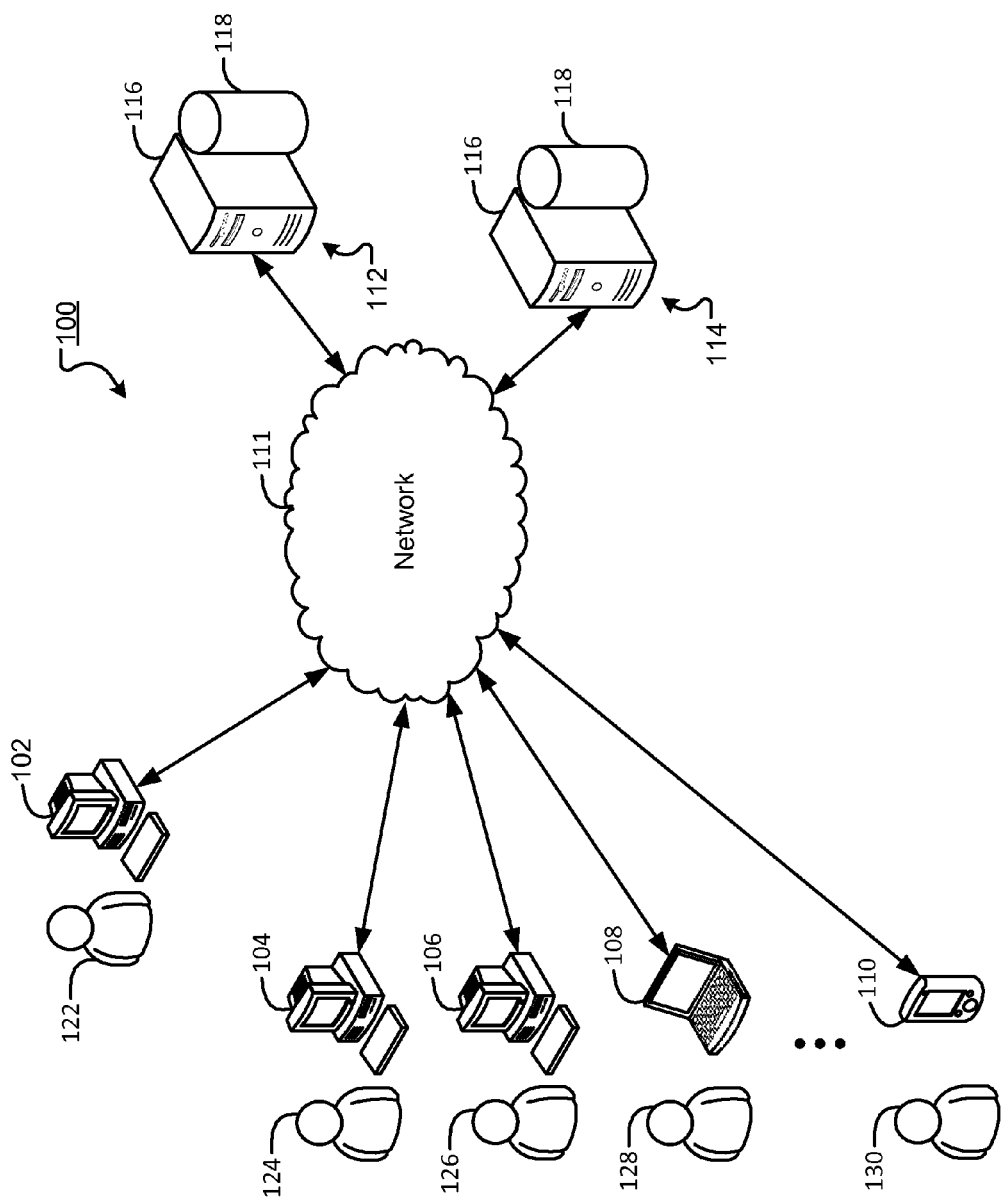
FIG. 1 is a block diagram showing an example of a network environment.

FIG. 1 is a block diagram showing an example network environment on which the process described herein for presenting search results may be implemented. In this regard, FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include many thousands of Web sites, computing devices and servers, which are not shown.

The network 111 can include a large computer network, examples of which include a local area network (LAN), wide area network (WAN), the Internet, a cellular network, or a combination thereof connecting a number of mobile computing devices, fixed computing devices, and server systems. The network(s) may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, for example, using a Bluetooth, WiFi, or other such transceiver.

Computing devices 102 to 110 enable respective users 122 to 130 to access and to view documents, for example, Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
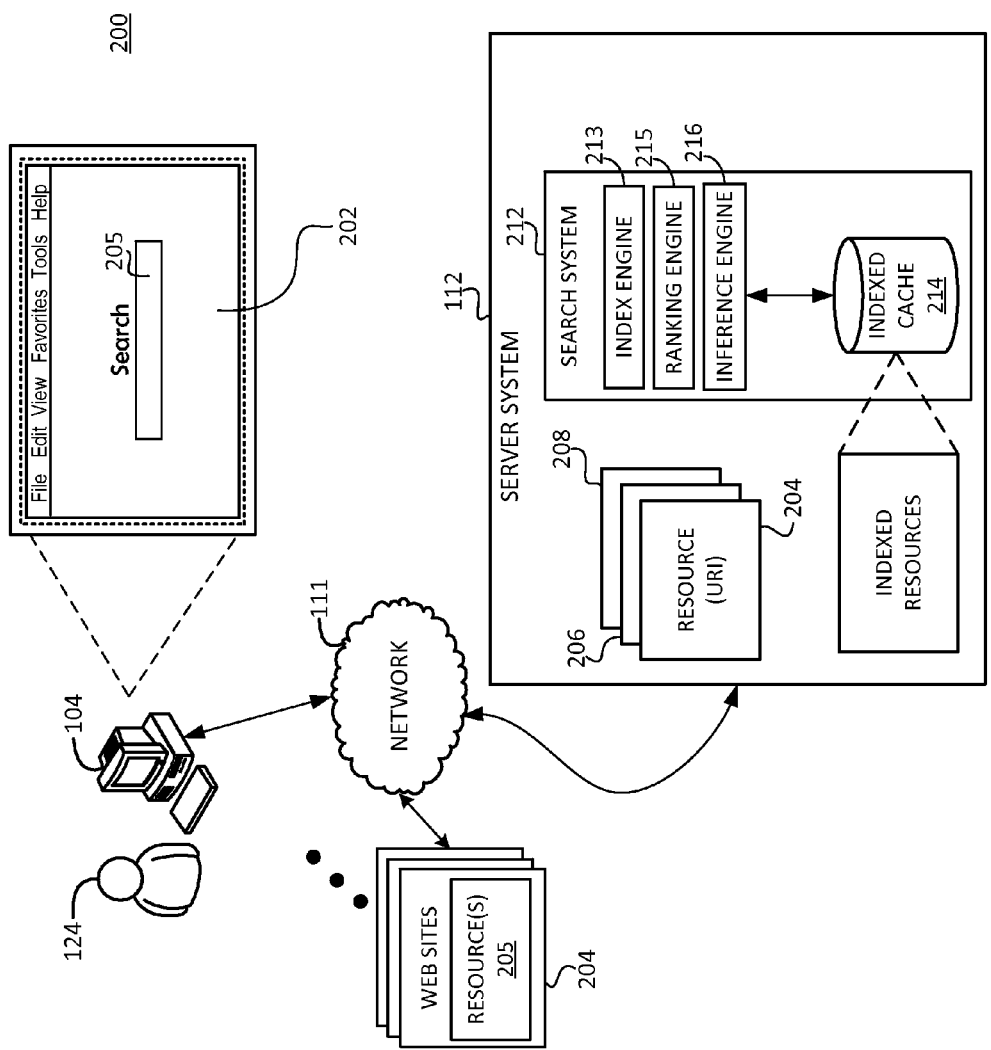
FIG. 2 is a block diagram of an example of a part of the network environment of FIG. 1.

FIG. 2 is a block diagram of an example part of the network environment of FIG. 1. In this regard, FIG. 2 shows a portion 200 of example network environment 100. In FIG. 2, computing device 104 communicates with server system 112 to display a Web page 202 of a Web site. Specifically, server system 112 stores a plurality of resources 204, 206, 208 which have respective resource identifiers (Resource ID). For example, the resource 204, 206, 208 can each correspond to different Web pages of the same Web site, or can correspond to Web pages of different Web sites.

To view a Web page, user 124 can input or select a Resource ID using a browser that is executed on computing device 104. The Resource ID can include, for example, a uniform resource indicator (URI) or a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page, through which a user may access a search system. The Web page may include a field 205 for inputting search terms that are transmitted to the search system. In response, the search system performs a search of an indexed cache, and returns a search results list to a user. The search results list may include, e.g., connections to content that is relevant to the search terms.

Referring to FIG. 2, network environment 100 includes a search system 212 that identifies resources 205 by crawling and indexing resources provided by content publishers on Web sites 204. In this regard, search system 212 may include an indexing engine 213 that indexes resources (e.g., Web pages, images, or news articles on the Internet, microblog posts, social networking posts and annotations). Data about the resources 205 can be indexed based on the resource 205 to which the data corresponds. The indexed and, optionally, cached copies of the resources 205 can be stored in an indexed cache 214. A ranking engine 215 (or other software) ranks the resources that match the query. Social graph information, an example of which is described below, can be included in a same index as other resources or in a separate index (not shown). Search system 212 also includes an inference engine 216 for inferring affinity of a user to a party based on interaction(s) with online content associated with that party, as described below with respect to FIG. 3. Search system 212 may be implemented, e.g., on server system 214 as shown or on other appropriate hardware.

In response to a search query, search system 212 can access indexed cache 214 to identify resources 205 that are relevant to the search query. Search system 212 identifies resources 205 in the form of search results 218 and returns the search results to a requesting device in search results pages. A search result may be data generated by search system 212 that identifies a resource 205, and that includes a link to the corresponding resource. An example search result can include a Web page title, a snippet of text or a portion of an image extracted from the Web page, and the URL (Unified Resource Location) of the Web page.

Search system 212 takes into account social affinities that the user has to others when obtaining and presenting search results to the user. For example, a user's affinity to another party may be used to change (either increase or decrease) the ranking of future search results related to that party. Such affinities may also be used to promote online connection between the party and other parties, e.g., through social networking services.

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of the social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party likes content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on contact's posts can result in a closer social connection than occasional endorsements. Affinity can change over time. For example, as the types or frequency of interactions change with members of the social graph, the resulting affinities can change as well.

Users can designate particular resources as endorsed, share resources, quote URLs, or otherwise indicate an interest or liking of content, examples of which include a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., through a browser control or user interface element presented with the associated content).

A social graph is one way to represent connection between two parties, which may, or may not, be on the same social networking service. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph can include connections within a single network or across multiple networks.

Distinct social graphs can be generated for different types of connections. For example, a user can be connected with chat contacts in one social graph, email contacts in a second social graph, and connections from a particular social network in a third social graph. Each social graph can include edges to additional parties at greater degrees of separation from the user. For example, an email contact can have its own email contacts to others adding a degree of separation from the user (e.g., user→email contact→contact of email contact). These contacts can, in turn, can have additional contacts at another degree of separation from the user. Similarly, a party's connection to someone in a particular social network can be used to identify additional connections based on that person's connections. Distinct social graphs can include edges connecting one or more social graph to one or more other social graphs. Thus, a social graph can include a single social graph or multiple interconnected social graphs.

Affinity between members of a social graph can be represented by edges, e.g., in a database that stores data for the social graph. These edges can be weighted, either in that database or elsewhere, to reflect a level of affinity between two parties connected in the social graph. Affinity between parties can be content specific. For example, social graph data may identify specific types of content associated with an edge between parties and specific affinities for that content. For example, the social graph data may specify that, between two connected parties, the first party has a first level of affinity for the second party's videos and a second, different level of affinity for the second party's written work. Similarly, the social graph may specify that the second party has a third, different level of affinity for the first party's blogs.

Figure 3:
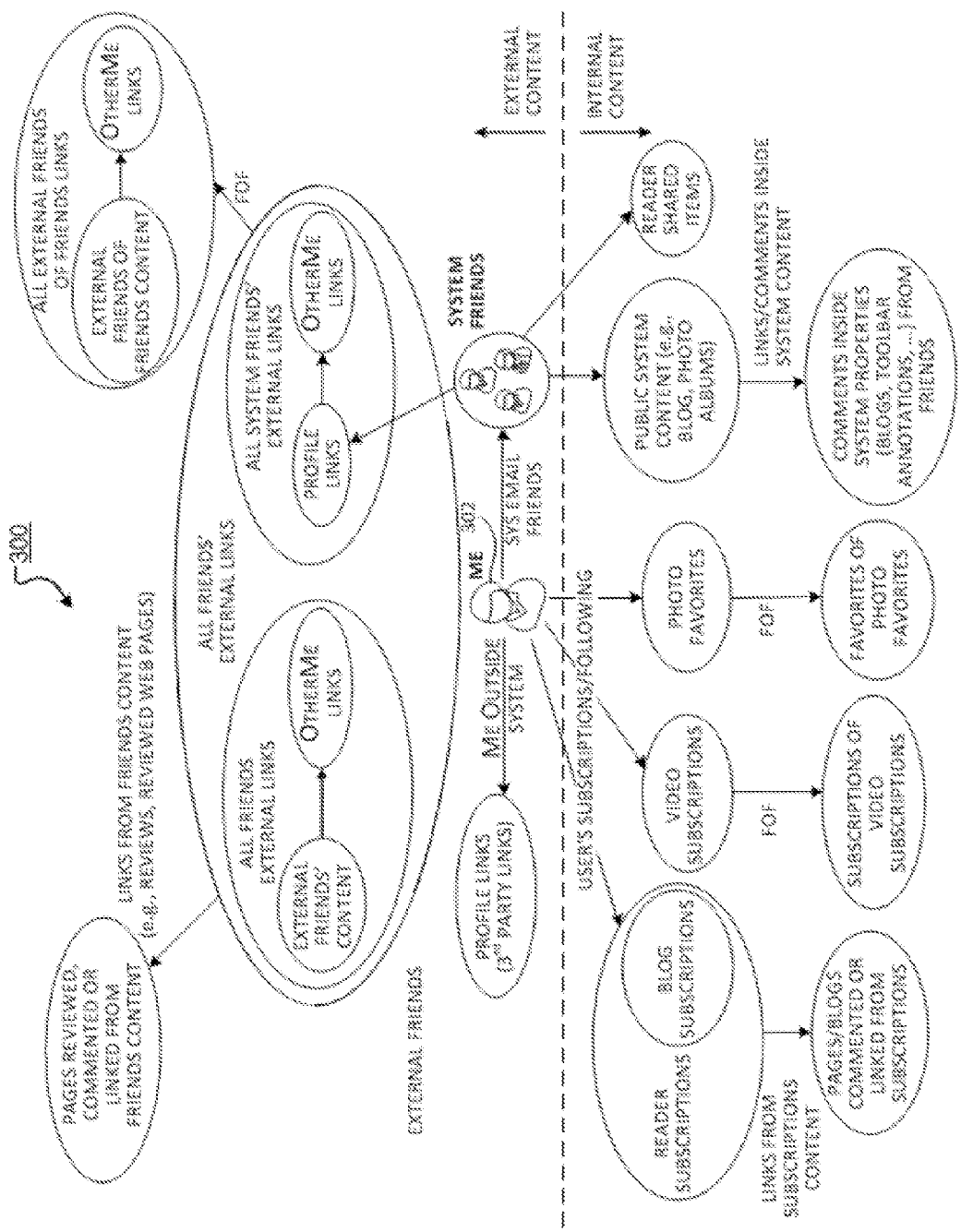
FIG. 3 is a conceptual view of an example of a social graph.

FIG. 3 is a conceptual view of an example social graph 300. In this regard, FIG. 3 shows sources of information for a social graph. In this example, the user's social graph is a collection of connections (e.g., users, resources, etc.) identified as having a relationship to the user 302 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

Diagram 300 shows a user 302 and the different connections that are possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes links to resources as well as contacts of the respective contacts. In another example, a user may be connected to a social networking account. That social networking account may reference an article in a newspaper. A social connection, therefore, may be established between the user and the author of the article.

In some implementations, the connections to a user within a specified number of degrees of separation can be considered the social graph of the user. Membership and degree of separation in the social graph may be based on other factors, including a frequency of interaction. For example, a frequency of interaction by the user (e.g., how often the user visits a particular social networking site) or type of interaction (e.g., endorsing, selecting, or not selecting items associated with contacts). As interaction changes, the relationship of a particular contact in the social graph can also dynamically change. Thus, the social graph can be dynamic rather than static.

Figure 4:
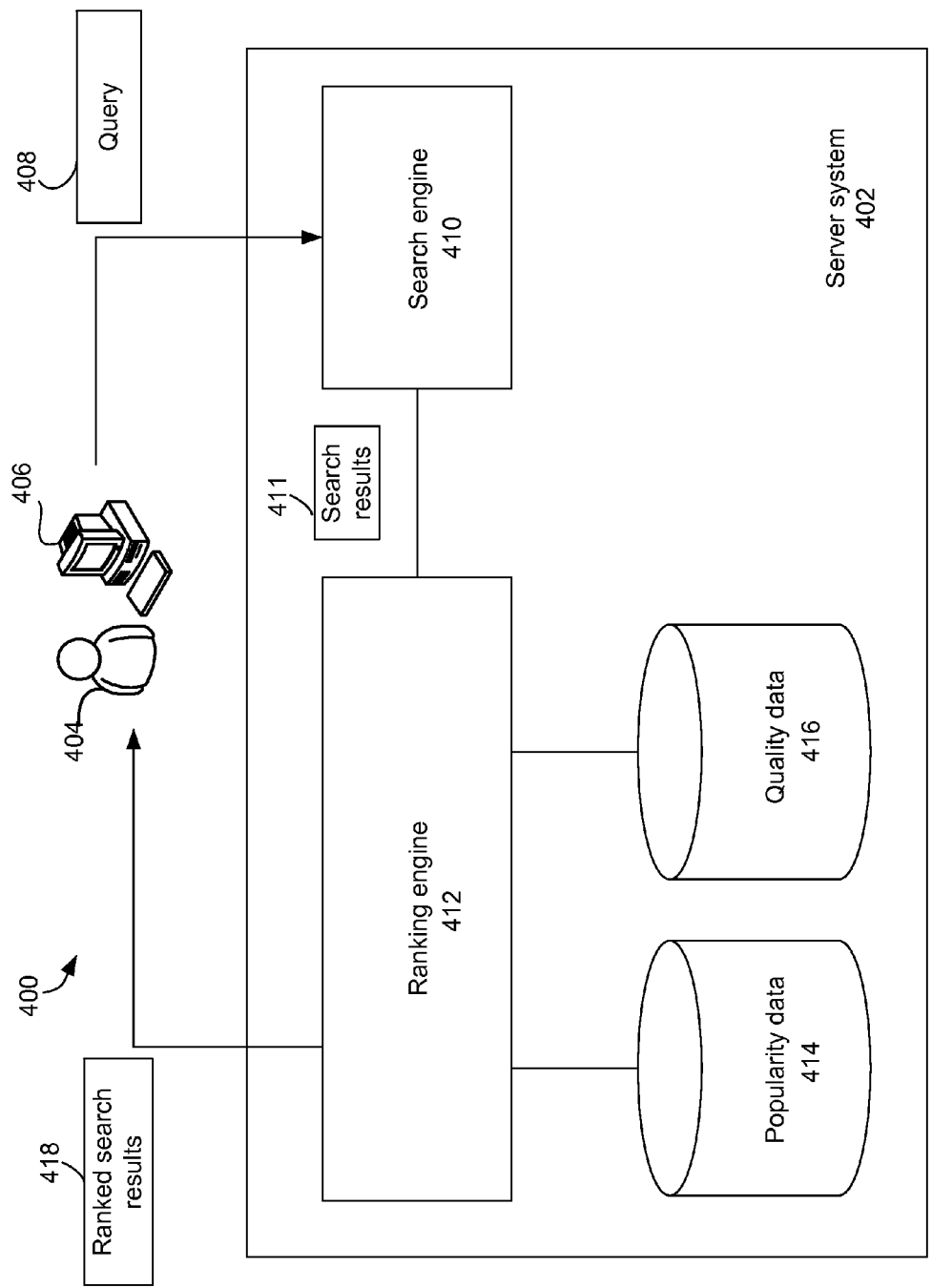
FIG. 4 is block diagram of an example of a search system.

FIG. 4 shows a system 400 that includes a server system 402 that communicates with a user 404 through a user device 406. In some examples, the server system 402 communicates with the user device over a network (e.g., the Internet). As described above, the user device 406 may submit a query 408 (e.g., search requests) to the server system 402, which may be associated with a social networking service (e.g., a social networking Web site). In some examples, the query 408 includes one or more search terms (e.g., one or more keywords) provided by the user 404 which can be used by the server system 402 to return a resource that is responsive to the query 408. For example, the query 408 may include search terms that relate to the identity of a second, different user on a social networking Web site (e.g., the query 408 can include the first and last name of a user whose profile the user 404 is attempting to locate). In another example, the query 408 may include an image. The image may be used to identify the second, different user, for example.

The query 408 is received by a search engine 410 associated with the server system 402. In some examples, the search engine 410 can identify resources (e.g., images, audio, video, Web pages, text, documents) that are relevant to the query 408 and present information about the resources in a manner that is useful to the user 404. The search engine 410 may be part of the search system 212 of FIG. 2. For example, if the query 408 is a query for user profiles that match a name specified by the query 408, the search engine 410 may identify one or more user profiles that satisfy the query 408 (e.g., by determining that one or more of the keywords in the query 408 match or resemble names or titles associated with the one or more user profiles). After the search engine 410 has identified one or more resources that satisfy the query 408, the search engine 411 may provide search results 411 to a ranking engine 412 for further processing. The ranking engine 412 may be part of the search system 212. The resources that are identified are limited to resources that the user is authorized to access, e.g., public data, private data that the user has permission to access.

In some examples, the ranking engine 412 can use stored information (e.g., popularity data 414 and/or quality data 416) to analyze the search results 411. For example, if the search results 411 identify multiple user profiles that are associated with the same or similar names (e.g., multiple profiles for users named "John Smith"), the ranking engine 412 may use the popularity data 414 and/or the quality data 416 to refine the search results 411 (e.g., in order to present ranked search results 418 to the user 404). In some examples, the ranking engine 412 can use the popularity data 414 and/or the quality data 416 to determine whether to add emphasis to the search results 411 (e.g., relative to one another when the search results are presented to the user 404 as ranked search results 418). Using the example above, if the search results include six user profiles associated with the user name "John Smith," the ranking engine 412 may identify whether the user profiles are, by some metric, more significant than the other user profiles in the search results 411. For example, the ranking engine 412 may determine, based on the popularity data 414 and/or the quality data 416, whether a user profile in the search results 411 is significantly more popular or has a higher quality than the other user profiles in the search results 411. The quality of the user profile may be determined based on metrics derived from the quality data as described below.

In some examples, the popularity data 414 is stored information that identifies how popular a user (or a user's profile) is within a social networking application. For example, the level of popularity associated with a user profile can be influenced by a number of user profiles linked to, or associated with, the user profile in question. User profiles can be linked or associated with one another by friend status, subscriber status, follower status, or by other links and connections within a social graph or social networking service.

In some examples, the quality data 416 is stored information that identifies a level of prominence associated with a user profile within a social networking service. For example, for a given user profile, quality data 416 can be based on a number of other users who "like" the posts of the given user profile, the frequency with which other users comment on posts associated with the given user profile, and other factors. In general, the larger the number of users who "like" the posts of the given user profile, the higher the quality of the given user profile. Similarly, the greater the frequency with which other users comment on posts associated with the given user profile, the higher the quality of the given user profile. In some implementations, the contents of the comments may be analyzed to determine if the comments are positive or negative comments. The frequency of positive comments may increase the quality of the given user profile, the frequency of negative comments may decrease the quality of the given user profile.

While in this example the popularity data 414 and the quality data 416 are shown as being stored on the server system 402, the data can be stored anywhere that is accessible to the ranking engine 412.

In some examples, the popularity data 414 can include a popularity score for each user profile within a social networking service (e.g., a numeric score). The popularity score can be based at least in part on the factors described above, and each factor can be weighted according to a popularity metric. Similarly, the quality data can include a quality score for each user profile within a social networking service (e.g., a numeric score), which can be determined in a manner similar to that described above with regard to the popularity score. Both the popularity scores and quality scores can be updated accordingly based on changes associated with the user profiles (e.g., in real time as changes occur, according to a trigger, e.g., a user request, or according to a predetermined schedule). In some examples, the popularity data 414 and the quality data 416 may be stored in location that is remote to the server system 402 and is accessible to the ranking engine 412 over one or more networks.

To determine whether a given user profile within the search results 411 has a significantly higher popularity or quality than other profiles within the search results 411, the ranking engine 412 may determine whether a "popularity gap" and/or a "quality gap" exists between the given user profile and the rest of the search results 411. For example, the ranking engine 412 may determine whether the difference between a popularity score of a first user profile exceeds the popularity score of the next-highest user profile by a threshold amount. Similarly, the ranking engine 412 may determine whether a ratio of a popularity score of a first user profile to the popularity score of the next-highest user profile exceeds a threshold amount. For example, if the ratio threshold is 0.5, and the search results 411 include a first user profile with a popularity score of 4.0 and a second user profile with a popularity score of 2.0, the ratio of the popularity scores would be 2.0, which exceeds the ratio threshold of 0.5. Similar determinations can be performed with respect to the quality data 416.

Figure 5:
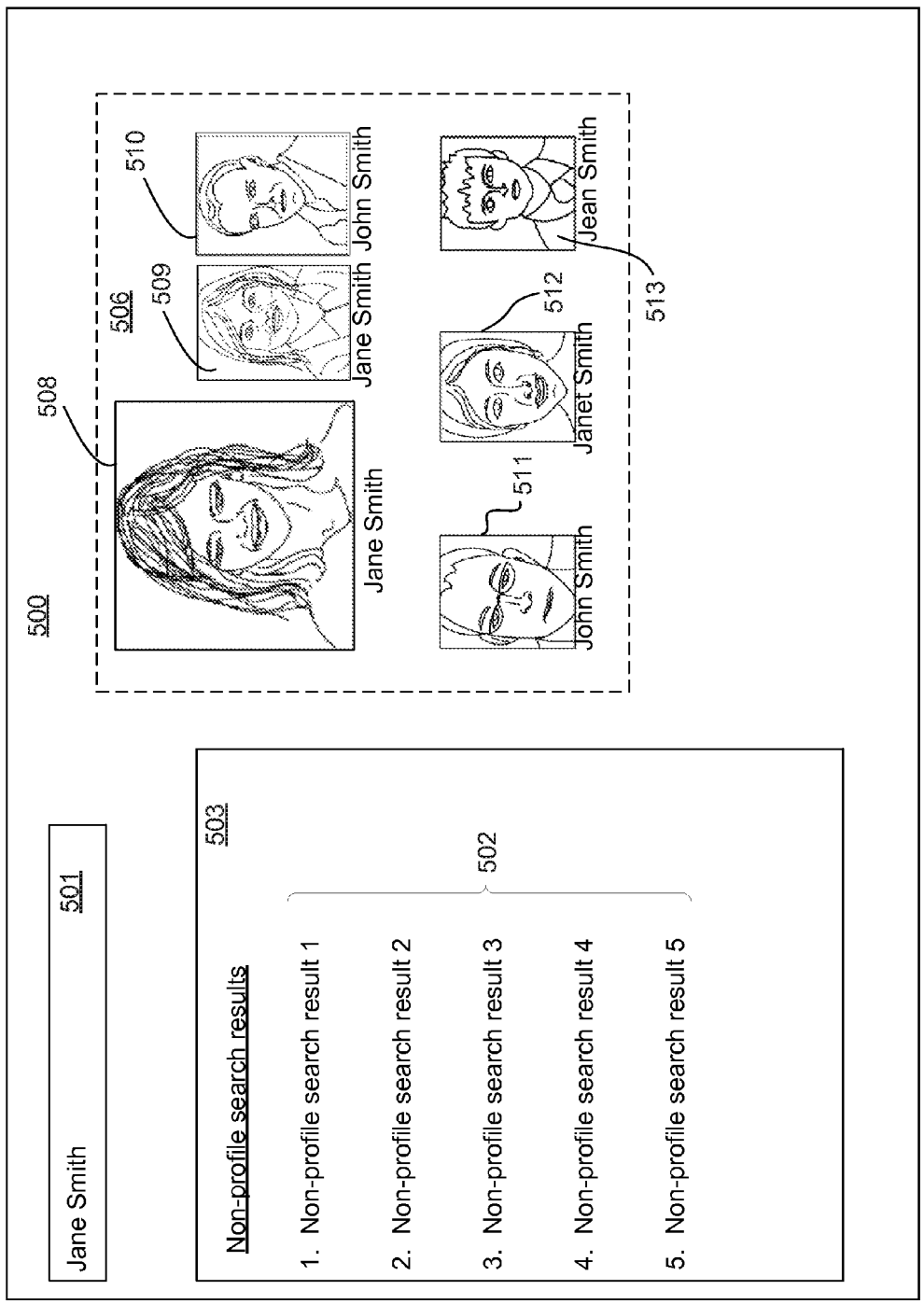
FIG. 5 is a diagram of an example of a user interface.

As a result of determining that a popularity and/or a quality of a given user profile exceeds the popularity of other user profiles within the search results 411 by a threshold amount, the ranking engine 412 may generate ranked the search results 418 that can be presented to the user 404, and may also determine that the given user profile should be emphasized (e.g., when the ranked search results are presented to the user 404). FIG. 5 shows an example of the emphasis that can be applied to a user profile within a user interface that presents ranked search results that include the emphasized user profile. The ranking engine 412 may perform relative popularity or quality determinations as a multi-stage calculation. For example, the ranking engine 412 may first determine whether a popularity of a given profile exceeds the popularity of other user profiles by a threshold amount, and may then determine whether a quality of a given profile exceeds the popularity of other user profiles by a threshold amount. Whether a given user profile receives emphasis can be based on one or both of the popularity and quality conditions are satisfied.

FIG. 5 shows a user interface 500 that displays search results for the query "Jane Smith" 501. The user interface may be, for example, a web page of a social networking Web site, and includes non-profile search results 502 within a non-profile search results display area 503. The non-profile search results 502 may include search results that do not correspond to the user profiles of users of a social networking service (e.g., news articles, web search results, or other content), but do correspond to the query 501. The user interface 500 also includes a user profile display area 506 that presents search results that correspond to user profiles 508-513. The user profiles 508-513 can be represented by images (e.g., profile pictures) of the respective users associated with the user profiles 508-513. One of the user profiles 508-513 is an emphasized user profile 508. In this example, the emphasized user profile 508 is represented by an image that is larger than the images associated with the user profiles 509-513. Other types of emphasis are possible. For example, the emphasized user profile 508 could be presented in a different color, style, font, or format than the other user profiles 509-513, or could include additional information (e.g., one or more tags, e.g., text or graphical tags) that identify the emphasized user profile 508 as being emphasized relative to the other user profiles 509-513 within the user profile display area 506.

In some examples, emphasis may be applied to more than one of the user profiles 508-513 within the user profile display area 506 based on additional popularity and/or quality determinations. For example, if the popularity and/or quality of the user profile 509 exceeds the popularity and/or quality of the other user profiles 510-513 by a threshold amount, the user profile 509 could be emphasized to be displayed more prominently than the user profiles 510-513, but less prominently than the emphasized user profile 508 (e.g., the image associated with the user profile 509 could be presented in a size that is larger than the respective images associated with the user profiles 510-513, but smaller than the image associated with the emphasized user profile 508). Such determinations and presentations of emphasis can be applied to any number of the user profiles 508-513.

Figure 6:
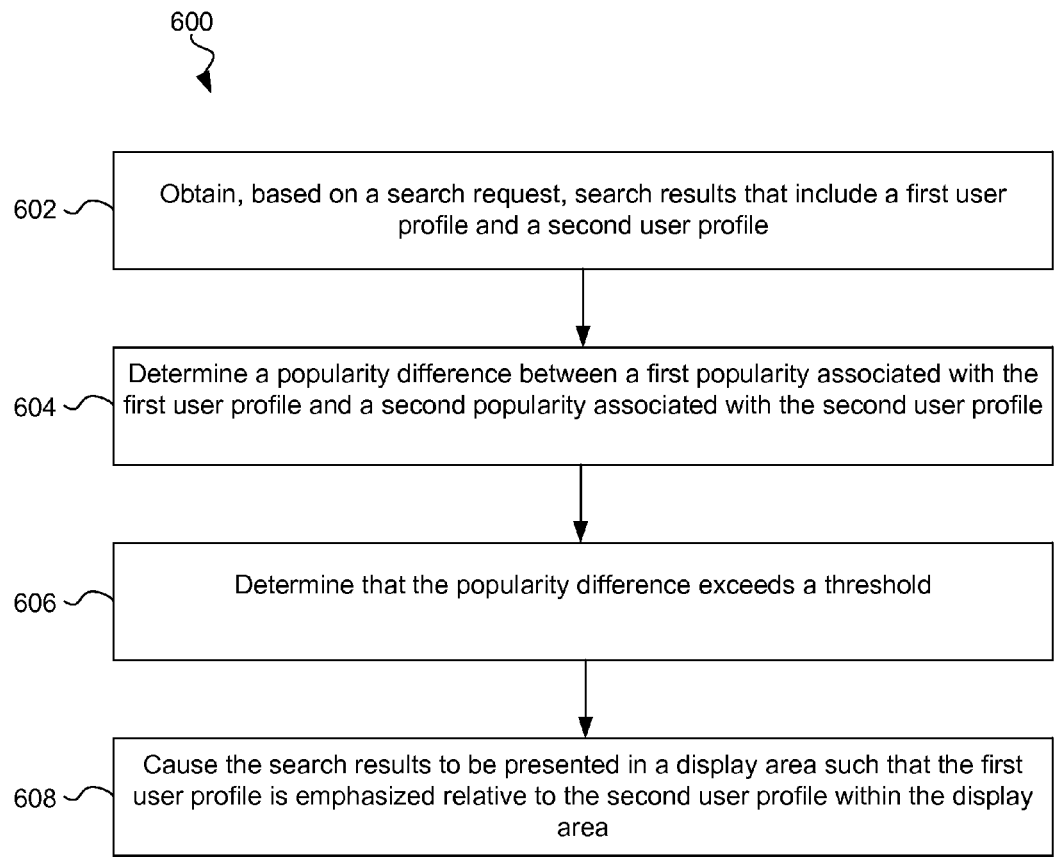
FIG. 6 is a flow chart of an example of a process for providing search results.

Other implementations are possible. For example, 503 and 506 can be blended e.g., mixed with the search results, in a separate display area in another position on the search results page FIG. 6 shows illustrates process 600 for providing search results. search results that include a first user profile and a second user profile are obtained based on a search request (602). For example, a social networking application may receive a query that includes one or more keywords. The keywords may be names of user profiles for which a user is searching within the social networking application 602. First and second user profiles may be associated with keywords included in the search request (e.g., the first and second user profiles may correspond to user names that are the same or are similar to the keywords provided in the search request).

A popularity difference is determined between a first popularity associated with the first user profile and a second popularity associated with the second user profile (604). For example, each user profile may be associated with a popularity score as described above, and determining a popularity difference may include determining a popularity ratio based on the respective popularity scores of the first and second user profiles or determining a difference of the first and second popularity scores by subtracting the lower score from the higher score. It is determined that the popularity difference exceeds a threshold (606). For example, the determined popularity difference can be compared to a threshold (e.g., a threshold ratio).

The search results are caused to be presented in a display area such that the first user profile is emphasized relative to the second user profile within the display area (608). For example, the ranking engine 412 could cause the first user profile to be emphasized within a user interface presented to the user who submitted the search request. The emphasis can be based on determining that the popularity difference exceeds the threshold.

Figure 7:
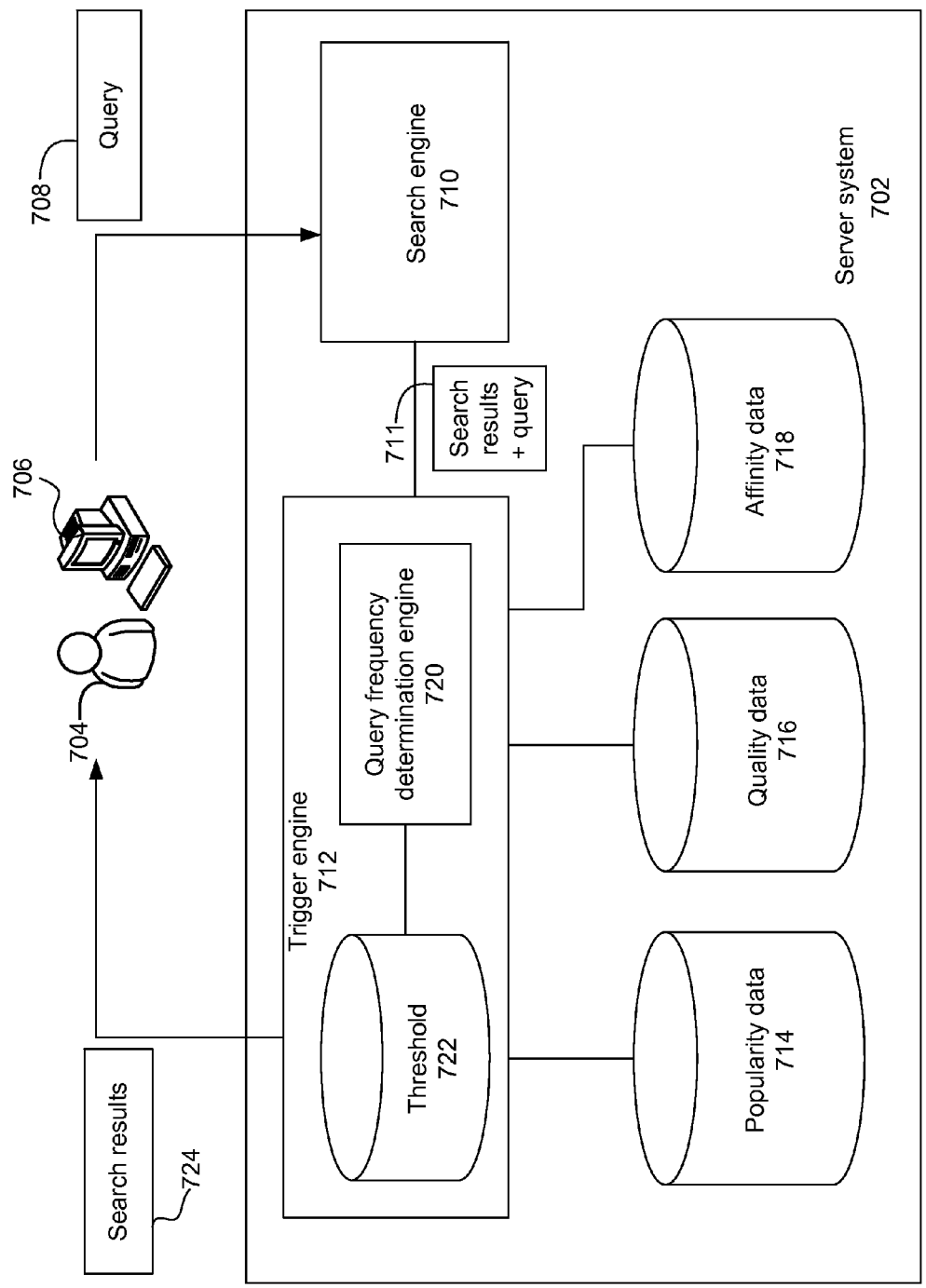
FIG. 7 is a block diagram of an example of a search system.

FIG. 7 shows a system 700 for determining, among other things, whether certain display areas (e.g., the user profile display area 506) should be presented on a user interface. Like the system 400, the system 700 includes a server system 702 that communicates with a user 704 through a user device 706. In some examples, the server system 702 communicates with the user device over a network (e.g., the Internet). As described above, the user device 706 may submit a query 708 (e.g., search requests) to the server system 702, which may be associated with a social networking service (e.g., a social networking Web site). In some examples, the query 708 includes one or more search terms (e.g., one or more keywords) provided by the user 704 which can be used by the server system 702 to return a resource that is responsive to the query 708. For example, the query 708 may include search terms that relate to the identity of a second, different user on a social networking Web site (e.g., the query 708 can include the first and last name of a user whose profile the user 704 is attempting to locate).

The query 708 is received by a search engine 710 associated with the server system 702. The search engine 710 may be part of the search system 212. In some examples, the search engine 710 can identify resources (e.g., images, audio, video, Web pages, text, documents) that are relevant to the query 708 and present information about the resources in a manner that is useful to the user 704. For example, if the query 708 is a query for user profiles that match a name specified by the query 708, the search engine 710 may identify one or more user profiles that satisfy the query 708 (e.g., by determining that one or more of the keywords in the query 708 match or resemble names or titles associated with the one or more user profiles). After the search engine 710 has identified one or more resources that satisfy the query 708, the search engine 710 may provide search results 711 (which includes information associated with the query 708) to a trigger engine 712 for further processing. The trigger engine may be part of the search system 212.

In some examples, the trigger engine 712 can use the search results 711 (including information associated with the query 708) along with one or more of the popularity data 714, the quality data 716, and the affinity data 718 to determine whether a display area (e.g., a user profile display area) should be provided in a user interface. For example, the trigger engine can suppress (or otherwise prevent the display of) a user profile display area in situations where the search results 711 are undesirable (e.g., where the search results 711 include spam user profiles or user profiles which are misleadingly labeled and named). In some examples, spammers construct misleading user profiles to lure unsuspecting users to the misleading profiles.

To counteract this behavior, the trigger engine 712 can raise (or lower) the standards for what constitutes a valid or useful search result based on the frequency with which a query term is submitted to the search engine 710. To do this, query frequency determination engine 720 determines, based on the query information included in the search results 711, a frequency with which the query 708 has been submitted to the search engine 710. The frequency can be represented as a raw number of hits, a ratio, a percentile rank, or a frequency score. The frequency can be determined relative to a period of time (e.g., a frequency based on the last week, month, or year's worth of query data). After the frequency determination engine 720 determines the frequency, the threshold 722 can be altered based on the determined frequency. In some examples, the threshold 722 represents a threshold value of a given user profile as a search result, where the value of the user profile can be based on the popularity data 714, the quality data 716, and/or the affinity data 718. In some examples, the more frequent a query is submitted (e.g., the higher the frequency is), the higher the value of the search results 711 must be in order to trigger the presentation of a display area for those search results.

In some examples, the value of a given user profile in the search results 711 can be determined based on one or more of the popularity data 714, the quality data 716, and/or the affinity data 718. A given profile may have a "score" associated with each of the data sources, and the scores and/or the data can be combined to provide an overall value of the user profile. Data can be used from one, two or all three of the popularity data 714, the quality data 716, and/or the affinity data 718 in order to generate the value of the user profile. After a value of the user profiles included in the search results 711 have been determined, the trigger engine 712 can compare the value of the user profiles to the threshold 722 to determine whether a display area should be presented to a user. In some examples, such techniques prevent false or misleading profiles (e.g., false celebrity profiles) from appearing in search results (or from unnecessarily triggering the generation of a display area), as false user profiles may have lower popularity and quality scores than, for example, a celebrity or other high-profile user profile.

After the trigger engine has determined whether a display area will be presented to the user 704 (e.g., on a user interface displayed on the user device 706), search results 724, if any, can be provided to the user 704. In situations where the trigger engine 712 has determined that a display area (e.g., a user profile display area) should not be presented, the search results may include results that are unrelated to user profiles (e.g., news articles and other web content). If the trigger engine 712 determines that a display area should be presented, a display area can be provided on a user interface associated with the user device 706 for displaying one or more search results (e.g., user profiles) that are related to the query 708.

Other techniques may also be used to trigger the generation of display areas. For example, the trigger engine 712 may trigger the presentation of a display area based on determining that the query 708 has a frequency that exceeds a threshold, and that one or more user profiles in the search results 711 have an affinity score that exceeds a threshold (e.g., one or more of the user profiles is either a close friend of the searcher or of high quality and popularity (e.g., based on a people search score)). In another example, the trigger engine 712 may determine to present a display area based on determining that a query has a frequency below a threshold and one or more user profiles within the search results 711 are either a friend of the searcher or of a quality and popularity that exceed respective thresholds (e.g., based as decided by people search score). In yet another example, the trigger engine 712 may determine to present a display area based on determining that the query has a relatively low frequency and one or more profiles in the search results 711 are either friends of the searcher or satisfy a relatively conservative quality threshold.

In any of the examples above, the trigger engine 712 can be positively influenced by determining a query hit (e.g., a match) between a name provided in the query 708 and a title (e.g., the name field) of a user profile. In some examples, when the affinity data is used (e.g., to calculate an affinity score), the trigger engine can use the affinity data and data associated with the user profile that generated the query 708 to determine an affinity between the two profiles. The affinity score may represent, for example, the extent to which the profiles are related in a social graph, as described above.

Figure 8:
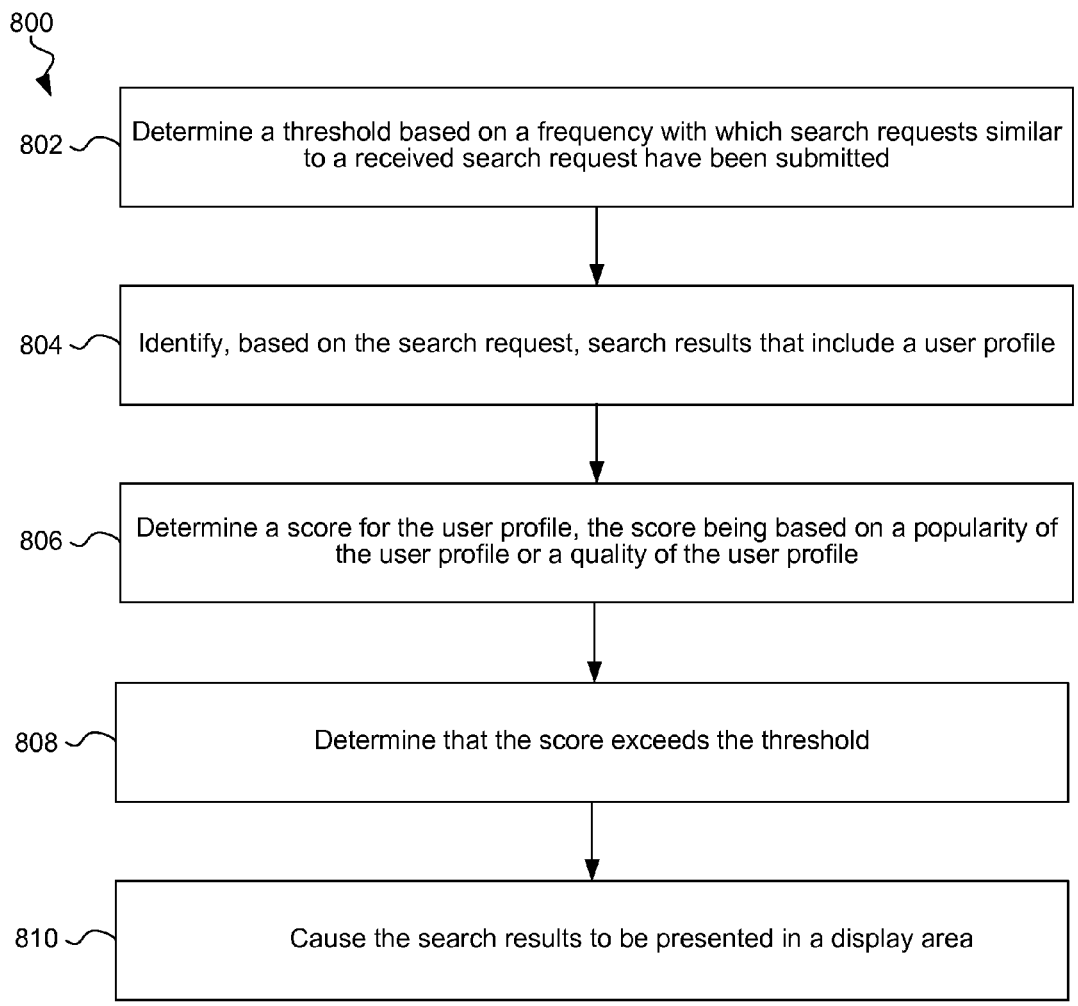
FIG. 8 is a flow chart of an example of a process for providing search results.

FIG. 8 shows a process 800 for causing search results to be presented in a display area. A threshold is determined based on a frequency with which search requests similar to a received search request have been submitted (804). A score (e.g., a value of the user profile) for the user profile is determined, the score being based on a popularity of the user profile or a quality of the user profile (806). It is determined that the score exceeds the threshold (808). The search results are caused to be presented in a display area associated with the social networking application (810).

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method comprising:
   determining, by one or more processing devices, one or more values for one or more user profiles from popularity scores that identify levels of popularity of the one or more user profiles, quality scores that identify levels of prominence associated with the one or more user profiles, or affinity scores that identify levels of closeness between user profiles;
   determining, by the one or more processing devices, that a first value for a first user profile exceeds a first threshold; and
   based on determining that the first value exceeds the first threshold, outputting, to a computing device, data for distinguishing a representation of the first user profile from a second user profile in a display area of a user interface;
   wherein the one or more user profiles are associated with search results of a search request, and the data for distinguishing a representation of the first user profile from a second user profile in a display area is output based on:
      a frequency with which the search request is received being below a second threshold; and
      the first user profile in the search results having an affinity score exceeding the first threshold.

2. The method of claim 1, wherein the display area is separate from one or more other portions of the user interface comprising search results that do not correspond to the one or more user profiles.

3. The method of claim 1, wherein the data for distinguishing a representation of the first user profile from a second user profile in a display area is output based also on:
   the first user profile in the search results having a popularity score exceeding the first threshold.

4. The method of claim 1, wherein the data for distinguishing a representation of the first user profile from a second user profile in a display area is output based also on:
   the first user profile in the search results having a quality score exceeding the first threshold.

5. The method of claim 1, wherein the data for distinguishing the representation of the first user profile from the second user profile causes the representation of the first user profile to be displayed as larger in size than a representation of the second user profile.

6. The method of claim 1, further comprising: causing the search results to be presented such that the representation of the first user profile is presented in combination with a first image and a representation of the second user profile is presented in combination with a second image, the first image and the second image being displayed separate from the search results.

7. The method of claim 1, wherein the affinity score is based on a proximity, in a social graph, of the first user to other users.

8. A system comprising:
   one or more processing devices; and
   one or more memory devices storing instructions that, when executed by the one or more processing devices, cause the one or more processing devices to perform operations comprising:
      determining, by the one or more processing devices, one or more values for one or more user profiles from popularity scores that identify levels of popularity of the one or more user profiles, quality scores that identify levels of prominence associated with the one or more user profiles, or affinity scores that identify levels of closeness between user profiles;
      determining, by the one or more processing devices, that a first value for a first user profile exceeds a first threshold; and
      based on determining that the first value exceeds the first threshold, outputting, to a computing device, data for distinguishing a representation of the first user profile from a second user profile in a display area of a user interface;

wherein the one or more user profiles are associated with search results of a search request, and the data for distinguishing a representation of the first user profile from a second user profile in a display area is output based on:
  a frequency with which the search request is received being below a second threshold; and
  the first user profile in the search results having an affinity score exceeding the first threshold.

9. The system of claim 8, wherein the display area is separate from one or more other portions of the user interface comprising search results that do not correspond to the one or more user profiles.

10. The system of claim 8, wherein the data for distinguishing a representation of the first user profile from a second user profile in a display area is output based also on:
  the first user profile in the search results having a popularity score exceeding the first threshold.

11. The system of claim 8, wherein the data for distinguishing a representation of the first user profile from a second user profile in a display area is output based also on:
  the first user profile in the search results having a quality score exceeding the first threshold.

12. The system of claim 8, wherein the data for distinguishing the representation of the first user profile from the second user profile causes the representation of the first user profile to be displayed as larger in size than a representation of the second user profile.

13. The system of claim 8, wherein the operations comprise:
  causing the search results to be presented such that the representation of the first user profile is presented in combination with a first image and a representation of the second user profile is presented in combination with a second image, the first image and the second image being displayed separate from the search results.

14. The system of claim 8, wherein the affinity score is based on a proximity, in a social graph, of the first user to other users.

15. One or more non-transitory machine-readable storage media storing instructions that are executable by one or more processing devices to perform operations comprising:
  determining one or more values for one or more user profiles from popularity scores that identify levels of popularity of the one or more user profiles, quality scores that identify levels of prominence associated with the one or more user profiles, or affinity scores that identify levels of closeness between user profiles;
  determining that a first value for a first user profile exceeds a first threshold; and
  based on determining that the first value exceeds the first threshold, outputting, to a computing device, data for distinguishing a representation of the first user profile from a second user profile in a display area of a user interface
  wherein the one or more user profiles are associated with search results of a search request, and the data for distinguishing a representation of the first user profile from a second user profile in a display area is output based on:
    a frequency with which the search request is received being below a second threshold; and
    the first user profile in the search results having an affinity score exceeding the first threshold.

16. The machine-readable storage media of claim 15, wherein the display area is separate from one or more other portions of the user interface comprising search results that do not correspond to the one or more user profiles.

17. The one or more non-transitory machine-readable storage media of claim 15, wherein the data for distinguishing a representation of the first user profile from a second user profile in a display area is output based also on:
  the first user profile in the search results having a popularity score exceeding the first threshold.

18. The one or more non-transitory machine-readable storage media of claim 15, wherein the data for distinguishing a representation of the first user profile from a second user profile in a display area is output based also on:
  the first user profile in the search results having a quality score exceeding the first threshold.

19. The one or more non-transitory machine-readable storage media of claim 15, wherein the data for distinguishing the representation of the first user profile from the second user profile causes the representation of the first user profile to be displayed as larger in size than a representation of the second user profile.

20. The one or more non-transitory machine-readable storage media of claim 15, wherein the operations comprise:
  causing the search results to be presented such that the representation of the first user profile is presented in combination with a first image and a representation of the second user profile is presented in combination with a second image, the first image and the second image being displayed separate from the search results.

* * * * *